(12) United States Patent
Bastani et al.

(10) Patent No.: US 9,691,313 B2
(45) Date of Patent: Jun. 27, 2017

(54) DISPLAY PIXEL STRUCTURES AND METHOD OF OPERATING SAME

(71) Applicant: Google Inc., Mountain View, CA (US)

(72) Inventors: Behnam Bastani, San Jose, CA (US); Nicholas Charles Loomis, Oakland, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/503,156

(22) Filed: Sep. 30, 2014

(65) Prior Publication Data
US 2016/0093241 A1 Mar. 31, 2016

(51) Int. Cl.
*G09G 3/00* (2006.01)
*G06F 3/14* (2006.01)

(52) U.S. Cl.
CPC .......... *G09G 3/002* (2013.01); *G06F 3/1446* (2013.01); *G09G 2300/026* (2013.01); *G09G 2300/0452* (2013.01); *G09G 2320/0233* (2013.01)

(58) Field of Classification Search
CPC ............... G09G 3/2003; G09G 3/3406; G09G 2300/026; G09G 2300/0452; G09G 2320/0233; G09G 2320/0646; G09G 2320/0686
See application file for complete search history.

(56) References Cited

U.S. PATENT DOCUMENTS

| 8,552,636 B2 | 10/2013 | Chaji et al. |
| 2008/0297541 A1* | 12/2008 | Credelle ........... G02F 1/133514 345/694 |
| 2009/0058873 A1 | 3/2009 | Brown et al. |
| 2010/0118045 A1 | 5/2010 | Brown et al. |
| 2011/0279493 A1* | 11/2011 | Phan ........................ H04N 9/30 345/694 |
| 2013/0285537 A1* | 10/2013 | Chaji .................... H01L 27/322 313/504 |

OTHER PUBLICATIONS

Bastani, et al., "U.S. Appl. No. 14/047,775, entitled: "Dynamic Backlight Control for Spatially Independent Display Regions", filed Oct. 7, 2013", (Oct. 7, 2013), Whole Document.

(Continued)

*Primary Examiner* — Premal Patel
(74) *Attorney, Agent, or Firm* — Blakely Sokoloff Taylor & Zafman LLP (57) ABSTRACT

Techniques and mechanisms for displaying an image with structures of a pixel array. In an embodiment, pixels of the pixel array each include three chrominance elements and a fourth luminance element. Of the four elements of a given pixel, a first subset of the elements are aligned along a first line, a second subset of the elements are aligned along a second line offset from the first line, and a third subset of the elements are aligned along a third line extending athwart the first line and the second line, wherein two of the elements are located on opposite sides of the third subset. In another embodiment, image data processing, for displaying an image with the pixel array, includes updating luminance parameters of a plurality of pixel data sets independent of any evaluation to update one or more types of chrominance parameters of the plurality of pixel data sets.

17 Claims, 9 Drawing Sheets

(56) References Cited

OTHER PUBLICATIONS

Bastani, et al., "U.S. Appl. No. 14/095,838, entitled: "Method, Apparatus and System to Determine Display Misalignment", filed Dec. 3, 2013", (Dec. 3, 2013), Whole Document.
Bastani, et al., "U.S. Appl. No. 14/137,908, entitled: "Method, Apparatus and System for Enhancing a Display of Video Data", filed Dec. 20, 2013", (Dec. 20, 2013), Whole Document.
Kazmierski, et al., "U.S. Appl. No. 14/303,190, entitled: "High Contrast Rear Projection Screen for Use With a Diverging Illumination Source", filed Jun. 12, 2014", (Jun. 12, 2014), Whole Document.
Temil, et al., "U.S. Appl. No. 14/109,609, entitled: "Architecture for Providing Pitch Variation Across a Waveguide Bundle for a Photodetector Array", filed Dec. 17, 2013", (Dec. 17, 2013), Whole Document.

\* cited by examiner

DISPLAY PIXEL STRUCTURES AND METHOD OF OPERATING SAME

BACKGROUND

1. Technical Field

This disclosure relates generally to display technologies, and in particular, to rear projection screens.

2. Background Art

Large wall displays can be prohibitively expensive as the cost to manufacture display panels rises exponentially with monolithic display area. This exponential rise in cost arises from the increased complexity of large monolithic displays, the decrease in yields associated with large displays (a greater number of components must be defect free for large displays), and increased shipping, delivery, and setup costs. Tiling smaller display panels to form larger multi-panel displays can help reduce many of the costs associated with large monolithic displays.

Figure 1A:
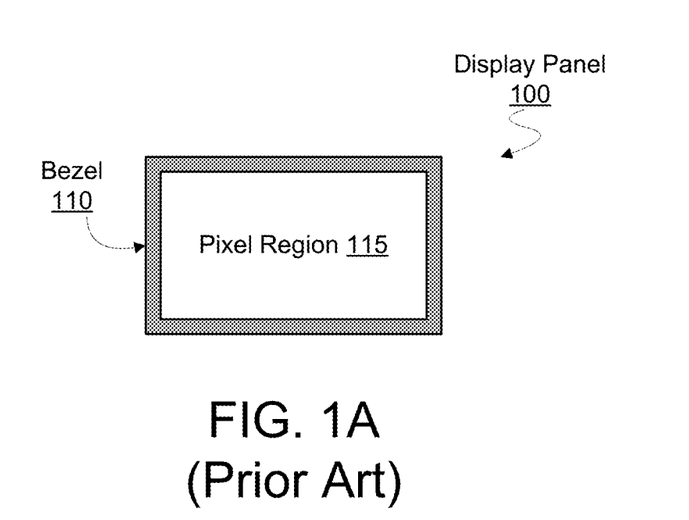
FIGS. 1A and 1B illustrate conventional display panel tiling.
Figure 1B:
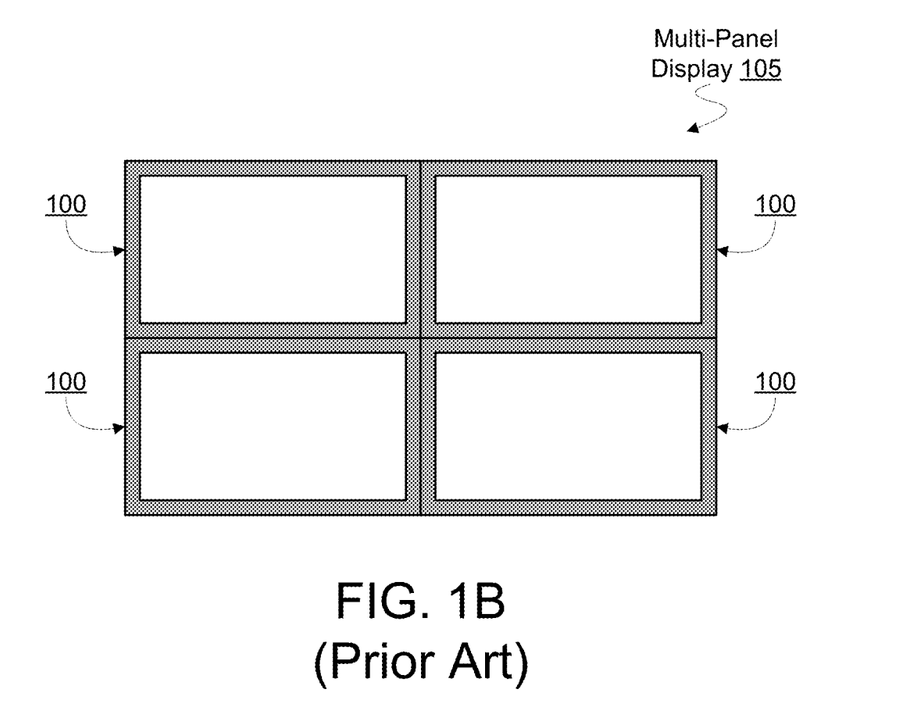

FIGS. 1A and 1B illustrate how tiling multiple smaller, less expensive display panels 100 together can achieve a large multi-panel display 105, which may be used as a large wall display. The individual images displayed by each display panel 100 may constitute a sub-portion of the larger overall composite image collectively displayed by multi-panel display 105. While multi-panel display 105 can reduce costs, visually it has a major drawback. Each display panel 100, includes a bezel 110 around its periphery. Bezel 110 is a mechanical structure that houses pixel region 115 in which the display pixels are disposed. In recent years, manufactures have reduced the thickness of bezel 110 considerably to less than 2 mm. However, even these thin bezel trims are still very noticeable to the naked eye, distract the viewer, and otherwise detract from the overall visual experience.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments of an apparatus, system and method of displaying an image with a pixel array are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain embodiments are discussed herein within the context of pixels in a tileable display system. However, such discussion may be extended to additionally or alternatively apply to any of the variety of other display devices and/or systems. In tileable display systems, brightness variation between displays, or between different portions within a single display, tend to be very apparent to a viewer. Alternatively or in addition, alignment between displays and/or between different portions of a single display tend to be critical with respect to the quality of image displayed to a viewer. So brightness correction and alignment tend to become very important.

Certain embodiments variously provide an improved pixel structure that, as compared to conventional structures, allows for improved overall display brightness while preserving image resolution. Such improved pixel structures also allow for image alignment to be improved across displays and/or across different portions of a single display. Perception by a viewer of an edge artifact due to misalignment between different portions of the displayed image tends to increase where there are edges or other transitions of content in a displayed image. Certain embodiments take advantage of a realization that the increased perceptibility of edge artifacts is substantially based on the perceived brightness variation associated with misaligned edge content. In other words, misalignment in color tends to be less perceptible by a viewer than misalignment in brightness. Certain embodiments avail of a realization that, due to the nature of how the human eye perceives color, green (G) pixels—e.g., as compared to red (R) pixels or blue (B) pixels—tend to represent a larger amount of information in the brightness dimension (in addition to the green chroma dimension).

Although there are some RGBW pixels (where "W" is for white, or luminance) in existence, the elements of such a RGBW pixel are typically positioned relative to one another to form a square arrangement or, alternatively, only a single line of elements. Moreover, in existing systems, a pixel's R value, B value and G value are constrained to being equal to the W value—e.g., in order to preserve color palette and color neutrality. This tends to impose a lot of constraints on the design of each of the R channel, G channel, B channel and W channel.

Figure 2:
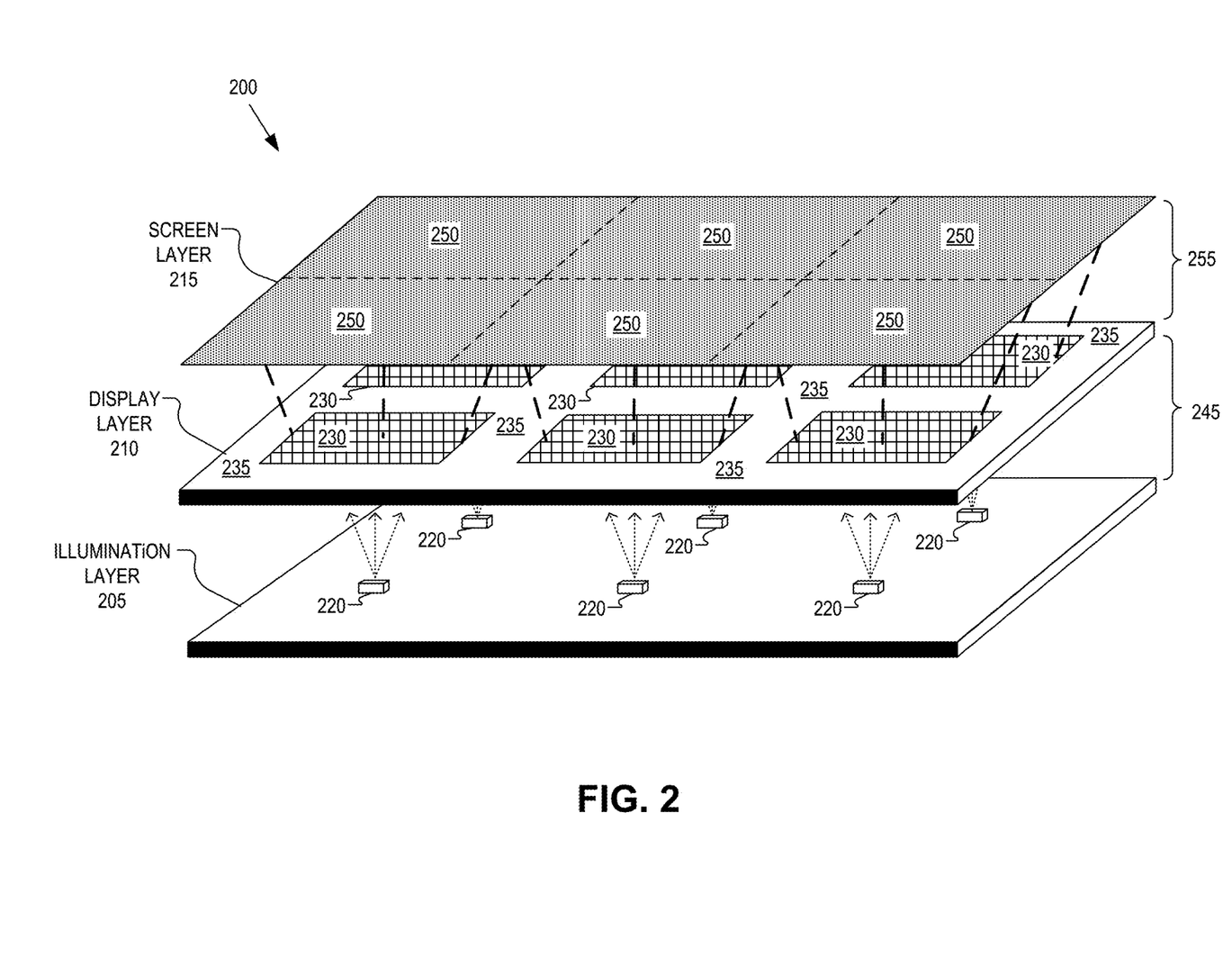
FIG. 2 is a perspective view illustrating functional layers of a rear projection display, in accordance with an embodiment of the disclosure.
Figure 3A:
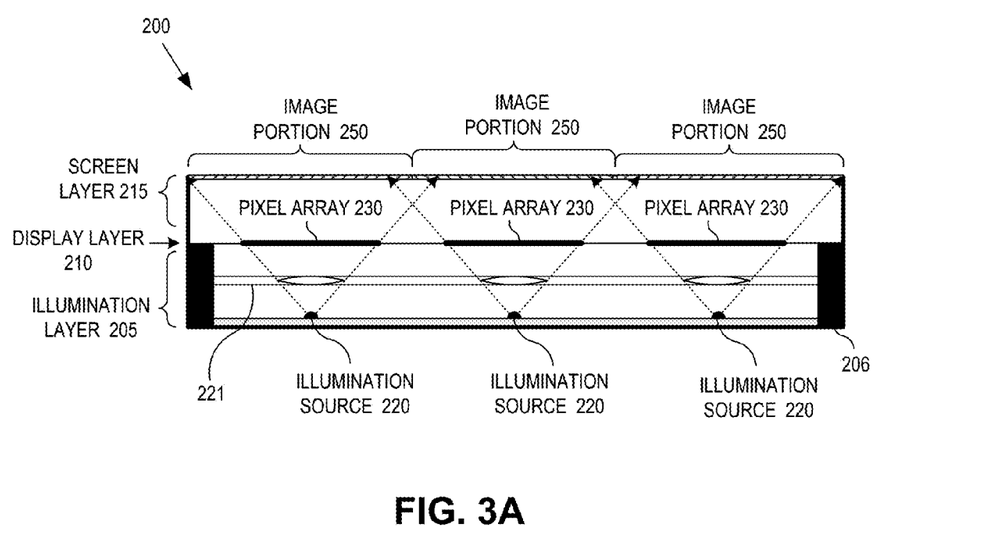
FIG. 3A is a cross-sectional view of functional layers of a rear projection display, in accordance with an embodiment of the disclosure.

FIGS. 2 and 3A illustrate functional layers of a rear projection display 200, in accordance with an embodiment of the disclosure. FIG. 2 is a perspective view of the layers of display 200 while FIG. 3A is a cross-section view of the same. The illustrated embodiment of display 200 includes an illumination layer 205, a display layer 210, and a screen layer 215. The illustrated embodiment of illumination layer 205 includes an array of illumination sources 220 and a lensing layer 221 (illustrated in FIG. 3A only for clarity). The illustrated embodiment of display layer 210 includes transmissive pixel arrays 230 separated from each other by spacing regions 235. The illustrated embodiment of screen layer 215 is divided into regions for displaying image portions 250 of an overall unified image. Rear projection display 200 is made up of a plurality of pixlets, each including an illumination source 220, a transmissive pixel array 230, and a screen region for displaying an image portion 250 all aligned within a column through display 200.

In the illustrated embodiment, each illumination source 220 is aligned under a corresponding pixel array 230 to illuminate a backside of the corresponding pixel array with lamp light. Illumination sources 220 may be implemented as independent light sources (e.g., color or monochromatic LEDs, quantum dots, etc.) that emit light with a defined angular spread or cone to fully illuminate their corresponding transmissive pixel array 230 residing above on display layer 210. The illumination layer 205 and display layer 210 are separated from each other by a fixed distance 245 (e.g., 8 mm). This separation may be achieved using a transparent intermediary (e.g., glass or plastic layers) and may further include one or more lensing layers 221 (including lenses, apertures, beam confiners, etc.) to control or manipulate the angular extent and cross-sectional shape of the lamp light emitted from illumination sources 220. In one embodiment, an illumination controller may be coupled to illumination sources 220 to control their illumination intensity. Illumination layer 205 may include a substrate upon which illumination sources 220 are disposed.

Transmissive pixel arrays 230 are disposed on the display layer 210 and each includes an array of transmissive pixels (e.g., 100 pixels by 100 pixels). In one embodiment, the transmissive pixels may be implemented as backlit liquid crystal pixels. Each transmissive pixel array 230 is an independent display array that is separated from adjacent transmissive pixel arrays 230 by spacing regions 235 on display layer 210. The internal spacing regions 235 that separate adjacent pixel arrays 230 from each other may be twice the width as the perimeter spacing regions 235 that separate a given pixel array 230 from an outer edge of display layer 210. In one embodiment, the internal spacing regions 235 have a width of 4 mm while the perimeter spacing regions 235 have a width of 2 mm. Of course, other dimensions may be implemented.

As illustrated, transmissive pixel arrays 230 are spaced across display layer 210 in a matrix with spacing regions 235 separating each transmissive pixel array 230. In one embodiment, transmissive pixel arrays 230 each represent a separate and independent array of display pixels (e.g., backlit LCD pixels). Spacing region 235 are significantly larger than the inter-pixel separation between pixels of a given transmissive pixel array 230. Spacing regions 235 provide improved flexibility for routing signal lines or the inclusion of additional circuitry, such as a display controller. Spacing regions 235 that reside along the exterior perimeter of display layer 210 also provide space for the bezel trim 206 of display 200. Bezel trim 206 operates as the sides of the housing for display 200. The spacing regions 235 that reside along the exterior perimeter also provide space for power and/or communication ports.

Although FIG. 2 illustrates display layer 210 as including six transmissive pixel arrays 230 arranged into two rows and three columns, it should be appreciated that various implementations of display 200 may include more or less transmissive pixel arrays 230 organized into differing combinations of rows and columns. As such, in embodiments having a one-to-one ratio of illumination sources 220 to transmissive pixel arrays 230, the number and layout of illumination sources 220 on illumination layer 205 may also vary. While FIG. 2 does not illustrate intervening layers between the three illustrated layers for the sake of clarity, it should be appreciated that embodiments may include various intervening optical or structural sub-layers, such as lens arrays, transparent substrates to provide mechanical rigidity and optical offsets, protective layers, or otherwise. Further details of the sub-layers of various embodiments of screen layer 215 are discussed below.

Figure 3B:
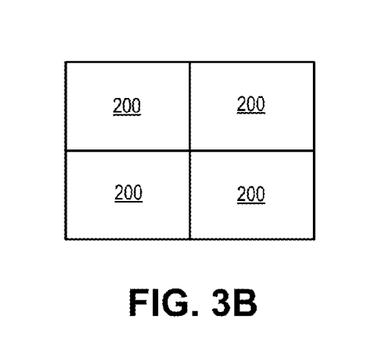
FIG. 3B illustrates how rear projection displays can be tiled to form larger seamless displays, in accordance with an embodiment of the disclosure.

Transmissive pixel arrays 230 are switched under control of a display controller to modulate the lamp light and project image portions 250 onto a backside of screen layer 215. In various embodiments, screen layer 215 includes matte material (or other diffusing material suitable for rear projection) that is disposed on a transparent substrate providing mechanical support. Image portions 250 collectively blend together on screen layer 215 to present a unified image to a viewer from the viewing side of screen layer 215 that is substantially without seams. In other words, the images created by transmissive pixel arrays 230 are magnified as they are projected across separation 255 (e.g., 2 mm) between display layer 210 and screen layer 215. The image portions 250 are magnified enough to extend over and cover spacing regions 235 forming a seamless unified image. The magnification factor is dependent upon separation 255 and the angular spread of the lamp light emitted by illumination sources 220. In one embodiment, image portions 250 are magnified by a factor of approximately 1.5. Not only does the unified image cover the internal spacing regions 235, but also covers the perimeter spacing regions 235. As such, display 200 may be positioned adjacent to other display tiles 200 and communicatively interlinked to form larger composite seamless displays, in which case the unified image generated by a single display tile becomes a sub-portion of a multi-tile unified image (e.g., see FIG. 3B).

Figure 3C:
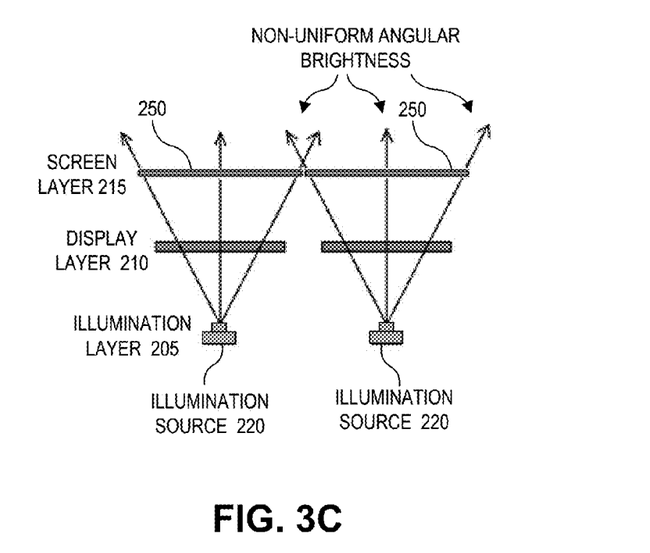
FIG. 3C illustrates angular brightness uniformity issues associated with rear projections displays illuminated by divergent light, in accordance with embodiments of the disclosure.
Figure 7:
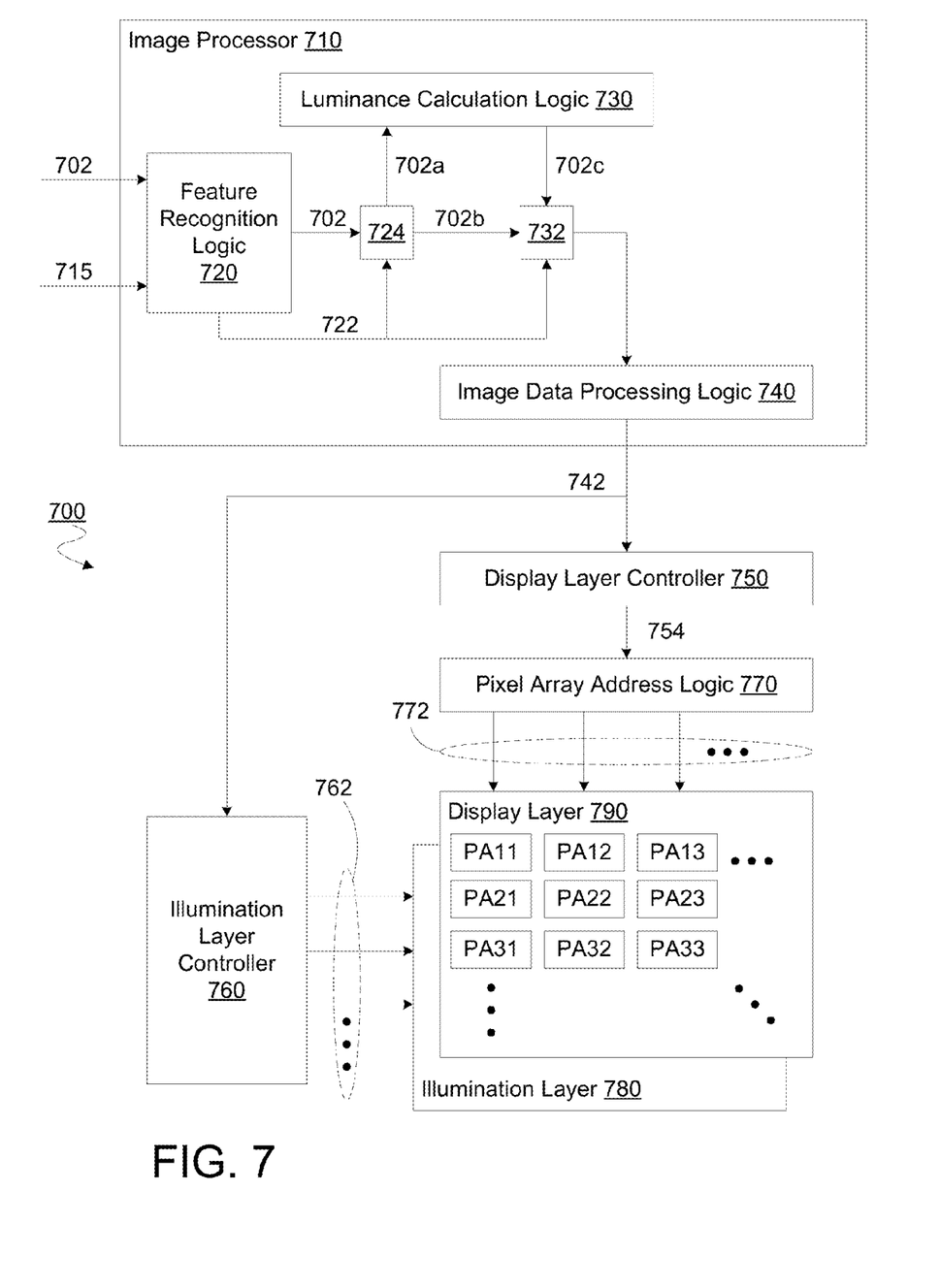
FIG. 7 is a block diagram illustrating elements of a display device to process and display image data according to an embodiment of the disclosure.

In a tiled rear-projection architecture, such as the one illustrated in FIGS. 2 and 3A, display light incident upon screen layer 215 is not collimated. This divergent light can result in angular brightness variations at different locations across screen layer 215. As illustrated in FIG. 3C, this deviation can be greatest around the perimeter of each image portion 250 defined by a given pixlet. Accordingly, FIGS. 4 and 7 present rear-projection screen architectures that accommodate non-collimated, obliquely incident display light while providing a relatively uniform angular brightness across the screen.

There are at least two main challenges in creating a large scalable display out of multiple tileable displays. The first is to create tileable displays that have very similar image quality. The second challenge is to tile the displays accurately enough so that the seams are not noticeable. Tileable displays typically require correction either due to internal structure non-uniformity within a single display or due to variation between multiple displays. Certain embodiments variously provide improved mechanisms and/or techniques to implement such correction by introducing a class of pixel structure that enables (for example) higher resolution alignment for tileable displays and/or increased efficiency of the displays. The class of pixel structures may result in a tessellation of pixels in a pixel array that is more complex, relative to that of conventional arrays.

Figure 4:
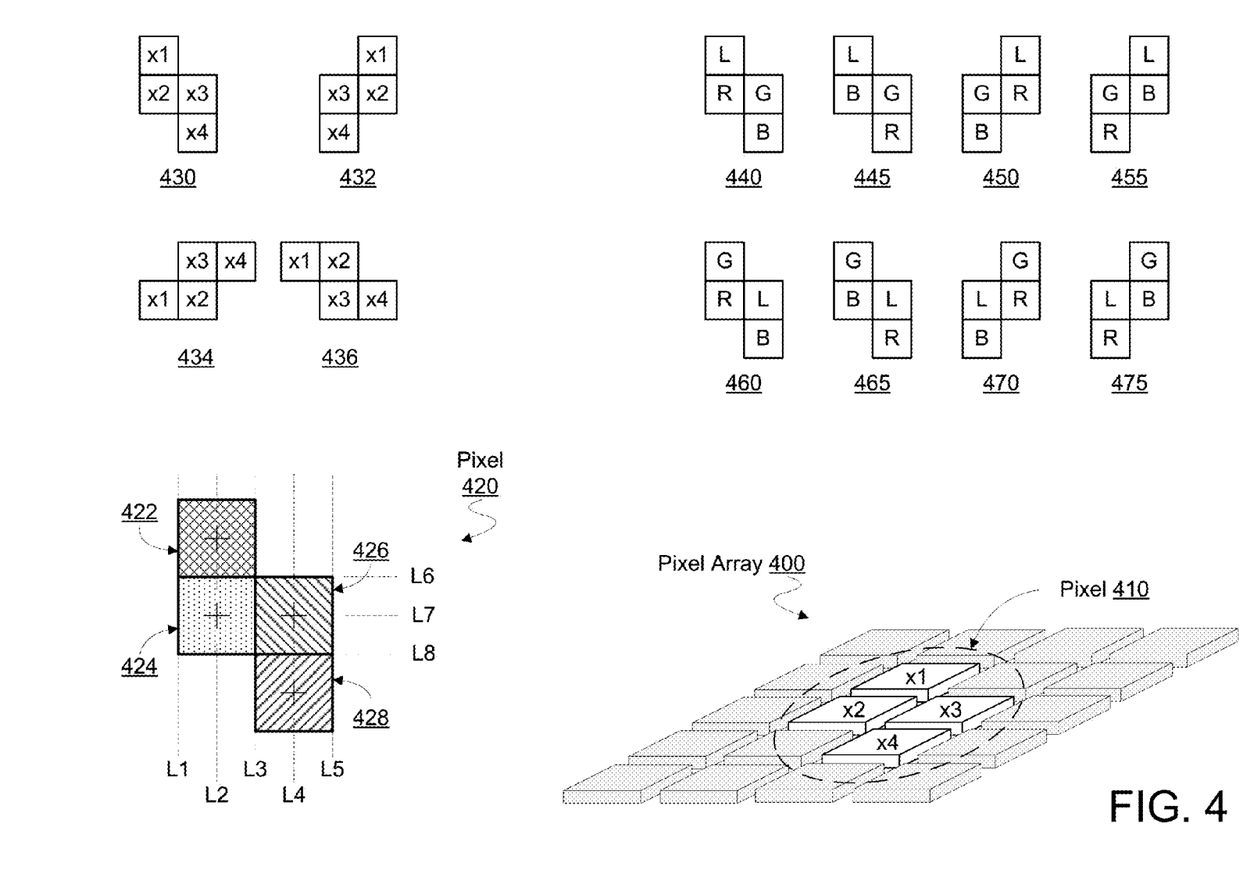
FIG. 4 is high-level functional view of various pixel structures each according to a respective embodiment of the disclosure.

FIG. 4 illustrates features of a pixel array 400 including a pixel 410 according to an embodiment. Pixel array 400 may include some or all of the features of pixel array 230, for example. In an embodiment, pixel 410 includes three chrominance (color) elements and one luminance (brightness) element, represented generically with the labels x1, x2, x3, x4. The three chrominance elements made each correspond to a different respective chrominance dimension—e.g., wherein a given chrominance element is to limit light having the color of its corresponding chrominance dimension. The luminance element may correspond to a luminance dimension representing a combination of the three chrominance dimensions. Certain embodiments are discussed herein with respect to a pixel including a red chrominance element, a green chrominance element, and a blue chrominance element (as well as a luminance element). However, such discussion may be extended to additionally or alternatively apply to pixels having any of a variety of other combinations of three chrominance elements and a luminance element.

Pixel 420 of FIG. 4 shows in more detail structures such as those of pixel 410. Pixel 420 includes elements 422, 424, 426 and 428 representing, in any of the variety of orders, a luminance element and three chrominance elements. Pixel 420 is merely one example of a pixel, according to an embodiment, wherein a first subset of the four elements (e.g. elements 422, 424) are aligned along a first line (e.g., line L2), a second subset of the four elements (e.g. elements 426, 428) are aligned along a second line (e.g., line L4) which is offset from—e.g., and parallel to—the first line, and a third subset of the four elements (e.g., elements 424, 426) are aligned along a third line (e.g., line L3) extending athwart the first line and the second line, wherein two of the four elements (e.g., elements 422, 428) are located on opposite sides of the third subset. For example, the elements 422, 424, 426, 428 may be located with respect to one another to form a sequence of elements that extends along an angled or curved line. In this context, alignment of elements refers to alignment of respective centers of such elements. However, alignment of pixel elements may additionally or alternatively be respect to one or more respective sides of such elements—e.g. where sides of different pairs of pixel elements 422, 424, 426, 428 are variously aligned along one or more of the lines L1, L3, L5, L6 and L8 shown.

An additional or alternative feature of pixel 420 is that a total number of elements of pixel 420 that are in an element row (or element column) of a pixel array including pixel 420 may be different than a total number of the elements of pixel 420 that are in another element row (column) of the pixel array. For example, element 422 may be the only element of pixel 420 in one element row, whereas elements 424, 426 may both be in another element row. In one embodiment, elements 422, 424, 426, 428 are positioned to span both two element rows and three element columns or, alternatively, both three element rows and two element columns. As discussed herein, a pixel row (column) of a pixel array may be distinguished, for example, from an element row (column) of the pixel array.

The configuration of elements 422, 424, 426, 428 in pixel 420 is merely illustrative of one embodiment, and corresponds to configuration 430 shown in FIG. 4. However, configurations 432, 434 and 436—representing various reflection and/or rotation transformations of configuration 430—illustrate at least some alternative pixel element configurations according to different embodiments. Configurations 430, 432, 434, 436 each illustrate a particular configuration of generic elements x1, x2, x3 and x4. However, the more particular arrangement of three chrominance elements and one luminance element within any given one of configurations 430, 432, 434, 436 may vary according to different embodiments. By way of illustration and not limitation, configuration 430 may allow for at least any of the arrangements 440, 445, 460, 465 shown for a red chrominance element (R), a green chrominance element (G), a blue chrominance element (B) and a luminance element (L). Similarly, configuration 432 may allow for at least any of the arrangements 450, 455, 470, 475 shown for R, G, B, L elements.

For a given pixel configuration—e.g. a particular one of configurations 430, 432, 434, 436—one arrangement of pixel elements according to that configuration may have one or more advantages over another arrangement. For example, such an arrangement may include a L element and another element of a particular chrominance type being both in different respective element rows and in different respective element columns. This other chrominance element—e.g. a G element—may be that which, of the three chrominance elements of the pixel, contributes the most brilliance information in terms of perception by the human eye. By locating a pixel's L element and G element (for example) in different element rows and element columns, certain embodiments provide for greater control in the modification of overall perceived brilliance provided by a pixel. In some embodiments, the L element and the G element of such a pixel may nevertheless be corner-wise adjacent to one another.

Additionally or alternatively, by providing a more complex tessellation pattern of pixels in a pixel array, certain embodiments provide for the L element of one pixel to be perceived by the human eye as being more closely associated with an the overall chrominance of an adjoining pixel. An effective structure for providing this feature may be achieved by locating the luminance element of a pixel at the end of a sequence of the pixel's four elements—e.g. as variously shown at least in arrangements 440, 445, 450, 455. This feature may be even more effectively achieved by locating at the other end of such a sequence of elements a chrominance element (e.g. a blue chrominance element of an RGBL structure pixel) which of the three chrominance elements, contributes the least brilliance information in terms of perception by the human eye. An example of such a structure is variously illustrated by arrangements 440, 450.

Figure 5:
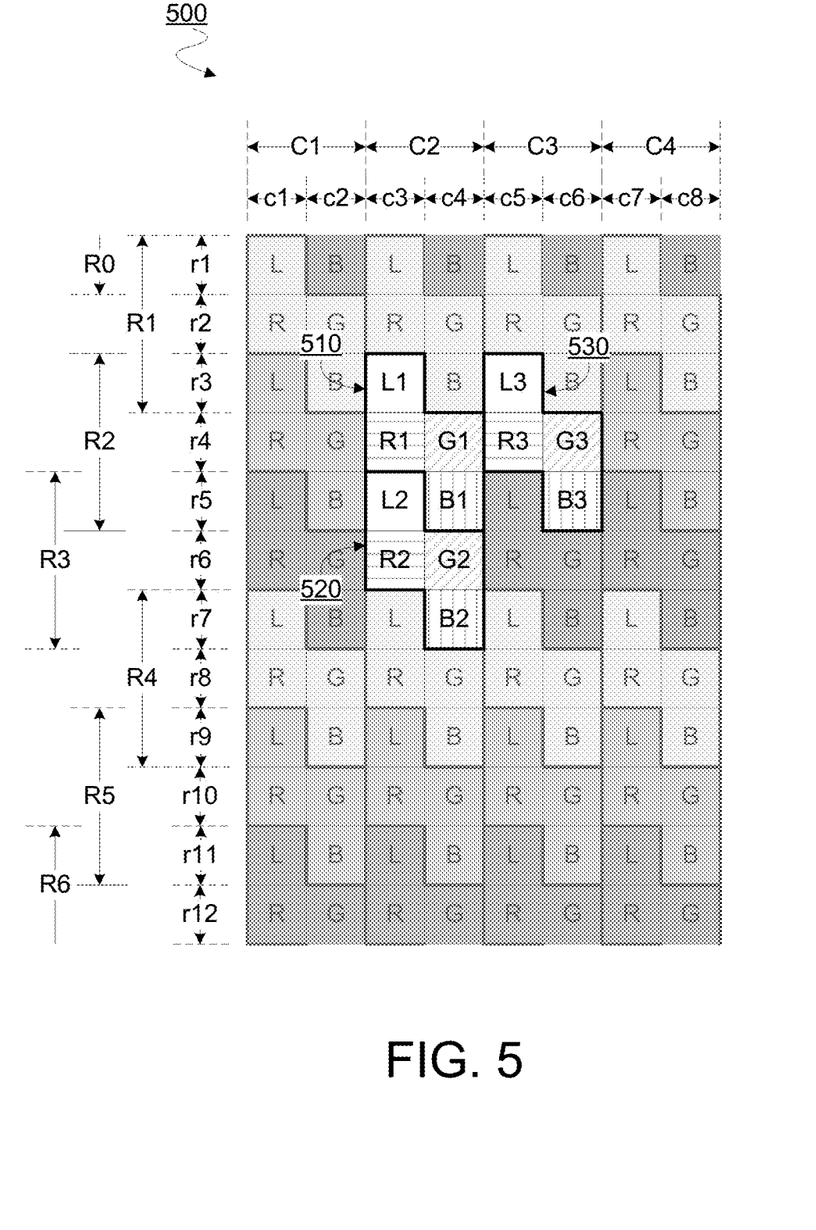
FIG. 5 is a block diagram illustrates elements of a pixel array according to an embodiment of the disclosure.

FIG. 5 illustrates elements of a pixel array 500 according to an embodiment. Pixel array 500 may include some or all of the features of a pixel array 230, for example. Pixels of pixel array 500 may be made using processes adapted from conventional fabrication techniques, which are not detailed herein to avoid obscuring features of various embodiments. Pixels of pixel array 500 may comprise pixel elements adapted from conventional LED, filter, phosphor or other pixel element structures. Although certain embodiments are not limited in this regard, pixel elements within an individual pixel of pixel array 500 may each have a row-wise width and/or column-wise height of 300 microns, for example. However, such pixel elements may have any of a variety of other dimensions, according to implementation-specific details.

To illustrate features of certain embodiments, pixel array 500 is shown as comprising pixels which each have configuration 430, such as that of pixel 420, where each pixel more particularly has an arrangement of pixel elements such as that of arrangement 440. However certain embodiments for not limited in this regard to the arrangement and/or orientation of such pixel structures within a given configuration. In pixel array 500, pixels are arranged in rows and columns—e.g., as represented by the illustrative pixel rows R0 through R6 and pixel columns C1 through C4. The distinction between individual pixels of pixel 500 are represented in FIG. 5 by bold lines, and pixel rows are distinguished from one another in FIG. 5 by various shading of respective pixels.

As shown in FIG. 5 pixel rows R0 through R6 may be variously comprised of respective ones of element rows r1 through r12. Moreover, pixel columns C1 through C4 may be variously comprised of respective ones of element columns c1 through c8. Due to the tessellation pattern of pixels in pixel array 500, pixel rows at least partially overlap one another—e.g. wherein element row r3 includes both pixel elements for pixels in pixel row R1 and pixel elements for pixels in pixel row R2. In an alternative embodiment wherein pixels of pixel array 500 have a configuration such as that of configuration 434, for example, pixel columns may overlap (rather than pixel rows).

Structures of pixel array 500 allow for improvements in image brightness and/or an ability to adjust for mechanical misalignment within a single display and/or between adjacent displays. For example, the channels for communicating pixels' L information and G information may be distributed across both different element columns and different element rows, allowing one such channel to be available to represent edge artifact information. As a result, image data processing may exploit this feature to mitigate a loss of resolution in image areas to which the human eye is sensitive. Moreover, pixel structures such as those of pixel array 500 enable image data processing to provide improved brightness uniformity correction with, for example, up to 3 times more efficiency compared to previous approaches.

Such improved alignment and/or brightness correction is now discussed in relation to a pixel 510 located in R2 and in C2, the pixel 510 including RGBL elements R1, G1, B1, L1, a pixel 520 located in R3 and in C2, the pixel 520 including RGBL elements R2, G2, B2, L2, and a pixel 530 located in R2 and in C3, the pixel 530 including RGBL elements R3, G3, B3, L3. Due to the tessellation of pixels including pixels 510, 520, 530, misalignment between such pixels only may cause comparatively slight color fringe and little or no perceived loss of detail in image content displayed by pixel array 500.

Alternatively or in addition, the position of luminance elements L1, L2, L3 of pixels 510, 520, 530—e.g., relative to one another and/or to chrominance elements such as G1, G2, G3—allow a wider variety of pixel brightness adjustments to be made within pixel array 500. For example, conventional image alignment techniques contemplate reassigning image data only on a whole-pixel basis—e.g. where all chrominance information (and in some embodiments, additional luminance information) of a pixel data set is reassigned from being represented using the elements of a first pixel to instead being represented using the elements of a second pixel. Such existing techniques do not support sub-pixel data reassignment for image alignment. Moreover, conventional image display techniques to reduce brightness variation include adjusting all three chrominance elements (and in some embodiments, an additional luminance element) for each of multiple pixels. This type of conventional brightness adjustment is inefficient at least with respect to the resulting level of brightness provided by such multiple pixels. As compared to existing display techniques and mechanisms, pixel array 500 allows for brightness adjustment functionality which preserves overall more saturated brightness values.

Certain embodiments variously provide a resolution in the assigning of pixels' luminance values that is more granular than a resolution which is provided with respect to the assigning of some or all types of chrominance data values. For example, pixel array 500 may couple to image processor logic (not show) which is to process image data including sets of pixel data—also referred to herein as "pixel data sets"—representing at least part of an image. Such pixel data sets may include three chrominance values (e.g. an R value, a G value and a B value) and, in some embodiments, a luminance value. In an embodiment, processing of the image data includes performing calculations to detect an edge artifact of the image to be represented. In response to detection of such an edge artifact, the image processor logic may modify a correspondence (e.g., an assignment) of one or more pixel data sets each to a respective pixel of pixel array 500. Alternatively or in addition, the image processor logic may compensate for the detected edge artifact by performing calculations to modify or otherwise determine luminance values (and in some embodiments, at least one type of chrominance value) of at least some pixels of pixel array 500.

In an illustrative scenario according to one embodiment, an edge artifact may be identified as being between or proximate to pixels 510, 520. In order to minimize the appearance of such an artifact, image processor logic may modify a luminance value (and in some embodiments, at least one type of chrominance value) for one or both of pixels 510, 520. For example, a pixel data value for element L1 may be assigned to element L2—e.g. where no other pixel data values for pixels 510, 520 are reassigned. Alternatively, a pixel data value for element L1 may be assigned to element G1—e.g. where the previous value for G1 is assigned to L2. Any of a variety of additional or alternative sub-pixel modifications to luminance data (and in some embodiments, select types of chrominance data) may be performed to reduce an edge artifact according to various embodiments—e.g. where no other pixel data values for pixels 510, 520 are reassigned. Such sub-pixel modifications to luminance data may additionally or alternatively be performed for a plurality of pixels including, for example, all of pixels 510, 520, 530. For example, edge artifact correction may include calculating an average (or median, mean, etc.) of luminance values for such a plurality of pixels. Some or all luminance elements of the plurality of pixels may then be assigned the calculated average (median, mean, etc.). Because the structures and arrangement of pixels 510, 520, 530 more approximate an interlocking configuration, red and blue elements of one pixel may offset a color imbalance of an adjoining pixel that is due to luminance and/or green chrominance reassignment.

Figure 6:
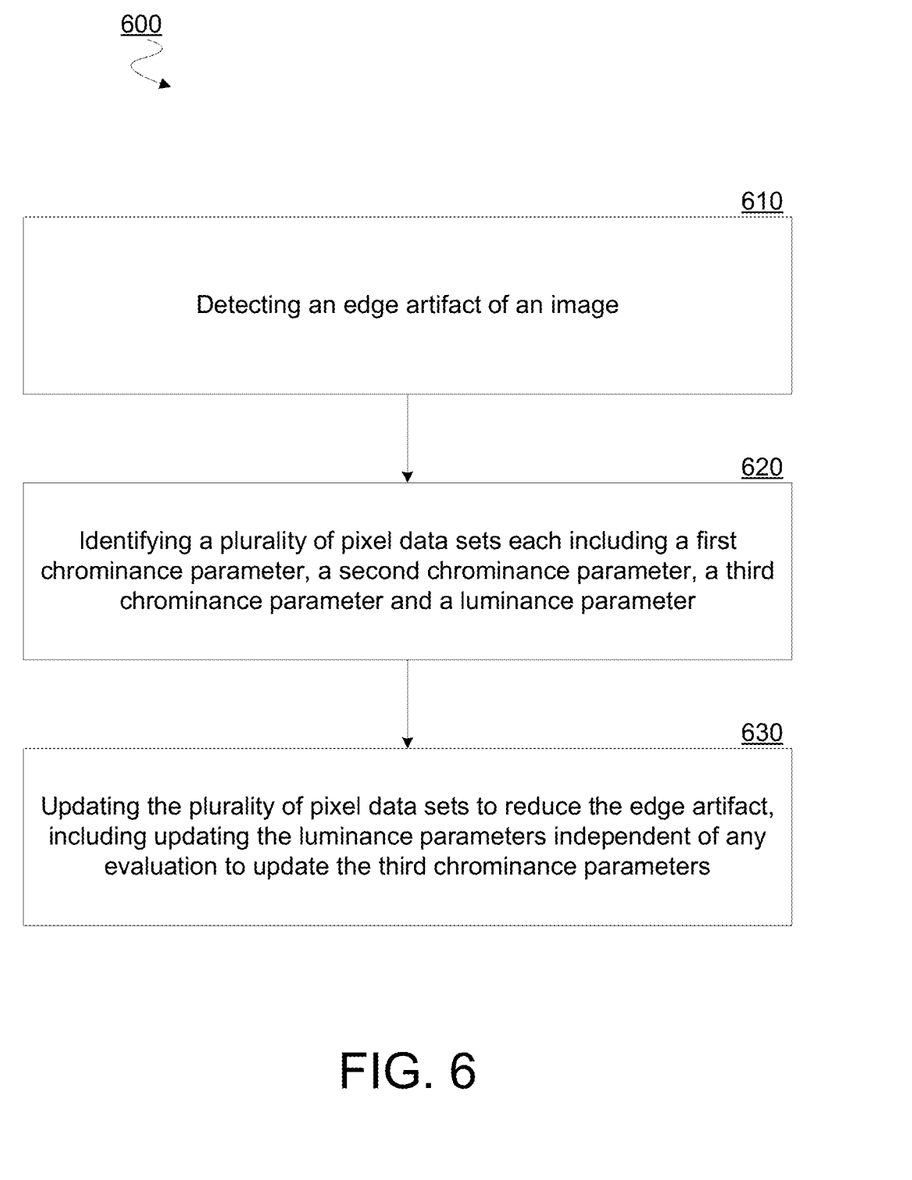
FIG. 6 is a flow diagram illustrating elements of a method for processing image data according to an embodiment of the disclosure.

FIG. 6 illustrates elements of a method 600 to process input content data (e.g., including video data and/or other image data) for the display of an image according to an embodiment. Method 600 may prepare input content data for the operation of a pixel array including, for example, some or all of the features of pixel array 500. In an embodiment, method 600 is performed to generate an image with any of a variety of display devices—e.g. including rear projection display 200—that comprise pixel structures such as those discussed herein.

Method 600 may comprise, at 610, detecting an edge artifact of an image that is represented at least in part by input content data. Detecting the edge artifact at 610 may comprise detecting a mechanical misalignment including, for example, a misalignment between different display or a misalignment between different pixel arrays (or other components) of a single display. Alternatively or in addition, detection of an edge artifact may comprise detecting a threshold level of change in luminance across a plurality of pixel data sets. The detection at 610 may include operations adapted from conventional edge detection techniques, which are not detailed herein to avoid obscuring features of certain embodiments. The input content data may comprise sets of pixel data that are to be variously associated each with a respective display pixel that is to emit respective light representing that pixel data set. The sets of pixel data may comprise RGB values and, in some embodiments, further comprise a luminance (e.g. white) value. In addition, a luminance component L may be included with or determined based on such RGB values, where the value of L is subsequently used in calculations to correct for high frequency brightness variation that may exists in the display. Such correction may be limited to luminance pixel elements—e.g., without affecting the overall chrominance of an image display.

In response to detection of the edge artifact at 610, method 600 may, at 620, identify a plurality of pixel data sets each including a first parameter, second parameter and third parameter corresponding, respectively, to a first chrominance dimension, a second chrominance dimension and a third chrominance dimension. By way of illustration and not limitation, the first, second and third parameters may correspond, respectively, to Green chrominance, Red chrominance and Blue chrominance. The pixel data sets may each further comprise a fourth parameter corresponding to a luminance dimension.

Method 600 may further comprise, at 630, updating the plurality of pixel data sets to reduce the image artifact, including performing an update of the fourth (luminance) parameters of the plurality of pixel data sets. The updating of the fourth parameters at 630 may be independent of any evaluation to update one other parameter type (e.g. the third parameters) of the plurality of pixel data set.

The updating at 630 may comprise any of a wide variety of sub-pixel modifications to values of only some pixel data parameter types. Any update of the plurality of pixel data sets to reduce the image artifact at 630 may be performed independent of any update to the third (e.g. blue chrominance) parameters of the plurality of pixel data sets. In some embodiments, such updates may be performed further independent of any update to the second (e.g. red chrominance) parameters and/or the first parameters of the plurality of pixel data sets. Alternatively or in addition, any update of the fourth parameters at 630 may be performed independent of any evaluation to determine an update to some or all of the first parameters, second parameters and third parameters of the plurality of pixel data sets. In an embodiment, any updating of the plurality of pixel data sets to reduce the image artifact is exclusive of any update to the first parameters, second parameters and/or third parameters of the plurality of pixel data sets.

The plurality of pixel data sets may include a first pixel data set and a second pixel data set—e.g. wherein the first and second pixel data sets correspond, respectively, to a first pixel and a second pixel adjacent to the first pixel. In such an embodiment, performing the update of the fourth parameters at 630 may include swapping with one another the respective values of the fourth parameter of the first pixel data set and the fourth parameter of the second pixel data set. Alternatively, performing the update of the fourth parameters at 630 may include assigning to the first parameter of the first pixel data set a value previously assigned to the fourth parameter of the first pixel data set. Moreover, the fourth parameter of the second pixel data set may be assigned to the value previously assigned to the first parameter of the first pixel data set.

In still another embodiment, performing the update of the fourth parameters at 630 may include calculating an average (or mean, median, etc.) of the fourth parameters of the plurality of pixel data sets and setting one or more of the fourth parameters of the plurality of pixel data sets to be equal to that average (mean, median, etc.). Any of variety of additional or alternative modifications to luminance parameter values (and, in some embodiments, select chrominance parameter values) may be performed, according to different embodiments.

FIG. 7 illustrates elements of a system 700 for displaying images according to an embodiment. System 700 includes an image processor 710 to process image information in preparation for image sub-portions to be displayed—e.g. by display hardware of system 700 such as that of display 200. For example, image processor 710 may comprise circuitry configured to perform some or all of the operations of method 600.

In an embodiment, image processor 710 includes feature recognition logic 720 to receive one or more frames of image information—as represented by the illustrative frames 702. The one or more frames 702 may each include respective pixel data sets which are each to be assigned (e.g. reassigned) to a particular pixel of a display which is included in or to couple to system 700. An example of one such display is represented in part as including the illustrative illumination layer 780 and display layer 790. Alternatively or in addition, pixel data sets of the one or more frames 702 may be modified—e.g. at least with respect to luminance—to reduce the perceptibility of a detected edge artifact of an image represented at least in part by frames 702.

For example, feature recognition logic 720 may comprise circuitry to identify various image data of frames 702 as representing one of smooth image content or edge image content—e.g. according to conventional edge detection techniques. In response to such identifying, feature recognition logic 720 may selectively direct various portions of image data for different respective image processing. By way of illustration and not limitation, feature recognition logic 720 may output frames 702 after they have been evaluated. Based on detection of an edge artifact, feature recognition logic 720 may provide control signaling 722 for logic 724 of image processor 710 to pass data 702b of the output frames 702 and to switch, copy or otherwise direct data 702a of frames 702 for processing by luminance calculation logic 730. Respective luminance values (and, in some embodiments, at least one type of chrominance values) of data 702a may be variously modified by luminance calculation logic 730—e.g. according to techniques herein. In another embodiment, data 702a only includes chrominance values, which luminance calculation logic 730 receives to provide an initial calculation of luminance values for such pixel data sets. Some or all of these initial luminance values may then be modified by luminance calculation logic 730 to reduce perceptibility of the detected edge artifact. In some embodiments, chrominance values for one or more chrominance dimensions (e.g. red and/or blue) are excluded from processing by luminance calculation logic 730.

In an embodiment, identification of an edge artifact in the image may additionally or alternatively be based on information 715 received from or otherwise describing another system (e.g. another display device, not shown) that operates with system 700. For example, information 715 may include image data that the other system is to display. Alternatively or in addition, information 715 may indicate a position or other configuration of the other system relative to system 700. Based on information 715, feature recognition logic 720 may, in certain embodiments, identify an image data portion of frames 702 as corresponding to an image data portion of information 715—e.g. where such image data portions are to represent respective image content that are to adjoin one another. In response to such identification, feature recognition logic 720 may use such image data portion of information 715 for improved edge detection.

Combination logic 732 of image processor 710 may combine data 724b with data 702c generated by luminance calculation logic 730. Based on data 702b, 702c, combination logic 732 may output pixel data sets for additional processing—e.g. by image data processing logic 740 that, for example, provides functionality adapted from conventional image data encoding techniques. In an embodiment, operation of image processor 710 controls display hardware included in or coupled to system 700. For example, display hardware of system 700 may include an illumination layer 780 and a display layer 790. Operation of illumination layer 780 and display layer 790 may correspond to operation of illumination layer 205 and display layer 210, respectively.

For example, illumination layer 780 may include illumination elements (not shown) each for a respective one of a plurality of pixel arrays of display layer 790. System 700 may include an illumination layer controller 760 that generates signals 762 to control how image sub-portions are to be variously displayed at different regions of display layer 790. Furthermore, a display layer controller 550 may provide signals 754 to control pixel array address logic 770 of the display hardware. Such control may be based, for example, on illumination layer controller 760 and/or display layer controller 550 receiving decoded image data information 742 from image data processing logic 740. In response to signals 754, pixel array address logic 770 may output signals 772 to variously operate pixel arrays of display layer 790. By way of illustration and not limitation, display layer 790 may include multiple rows of pixel arrays comprising, for example, a first row including pixel arrays PA11, PA12, PA13, a second row including pixel arrays PA21, PA22, PA23, a third row including pixel arrays PA31, PA32, PA33 and/or the like. Operation of such pixel arrays may include signals 772 communicating luminance and chrominance values to be variously represented by pixels of the pixel arrays, such as those pixels discussed herein.

Figure 8:
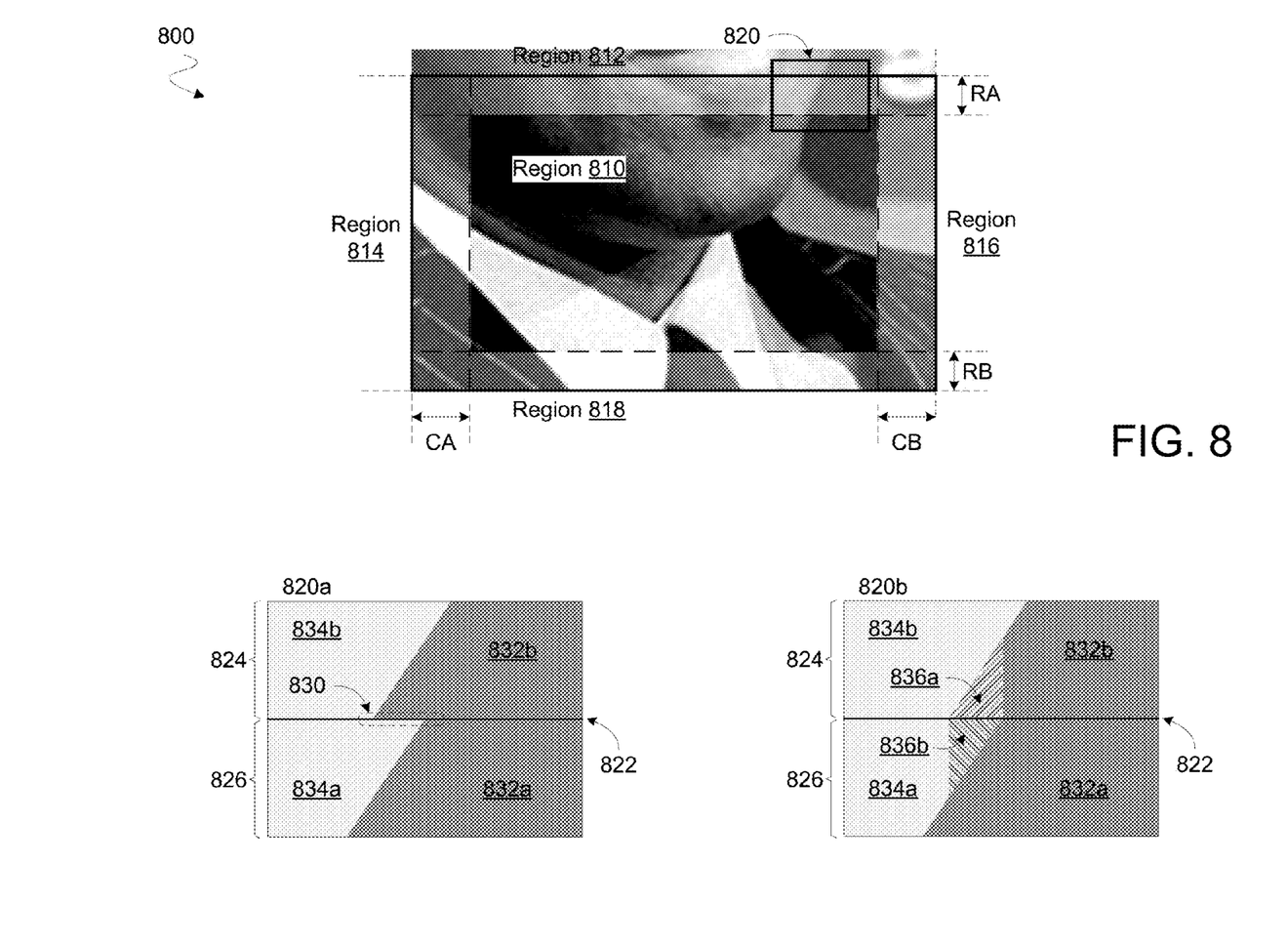
FIG. 8 illustrates features of an image displayed with pixel structures according to an embodiment of the disclosure.

FIG. 8 illustrates elements of an image 800 displayed by system 800 based on image data which is processed according to an embodiment. Image 800 may be displayed based on image data which is enhanced by image processor 710—e.g. according to method 600. The displayed image 800 includes a region 810 and regions 812, 814, 816, 818 which each adjoin a respective side of region 810. Some or all of regions 810, 812, 814, 816, 818 may be regions of the same display—e.g. regions of a screen layer of display 200. Alternatively, regions 810, 812, 814, 816, 818 may include regions of different displays—e.g. where region 810 is a region of a screen layer of display 200 and region 812 is a region of a screen layer of a different display. In an embodiment, regions 810, 812, 814, 816, 818 each correspond to a different respective pixel array which is illuminated for projection of a corresponding portion of the displayed image 800.

As shown in FIG. 8, region 810 may include sub-regions RA, RB which are closest to regions 812, 818, respectively, and sub-regions CA, CB which are closest to regions 814, 816, respectively. In an embodiment, the image processor may selectively modify, swap, calculate or otherwise determine pixel luminance values (and in some embodiments, less than all types of pixel chrominance values) based on whether image data corresponds to image content in one of RA, RB, CA, CB. Such selective image processing may be variously performed concurrently for multiple regions. By way of illustration and not limitation, a portion 820 of displayed image 800 includes respective sub-portions 824, 826 of regions 810, 812. Sub-portions 824, 826 may adjoin one another along an interface 822, which may be an interface between adjacent displays (although certain embodiments are not limited in this regard).

Processing of image data that represents image 800 may identify one or more edge artifacts. In an illustrative scenario according to one embodiment, an edge artifact 830 is the result of a misalignment between an interface of sub-regions 832a, 834a in region 826 and an interface of sub-regions 832b, 834b in region 824. Detail view 820a illustrates how edge artifact 830 may be displayed in the absence of display techniques according to various embodiments. By contrast, detail view 820b illustrates how edge artifact 830 may be mitigated by pixel structures and image data processing techniques of such embodiments.

Where edge artifact 830 is very large—e.g., on the order of multiple pixels—misalignment correction may include assigning pixel data sets to respective pixels in order to implement a relative shift between regions 824, 826 along interface 822. However, where more precise correction to edge artifact 830 is to be implemented, additional or alternative misalignment correction may include other processing of image data to shift, swap or otherwise modify luminance values of pixels which are proximate to edge artifact 830. More particularly, such other image data processing may be specific to luminance values of pixel data sets and less than all, if any, of the three types of chrominance values of such pixel data sets. Such sub-pixel luminance correction may result in regions 836a, 836b providing a comparatively smooth brightness transition, which reduces the perception of an edge artifact by the human eye.

Figure 9:
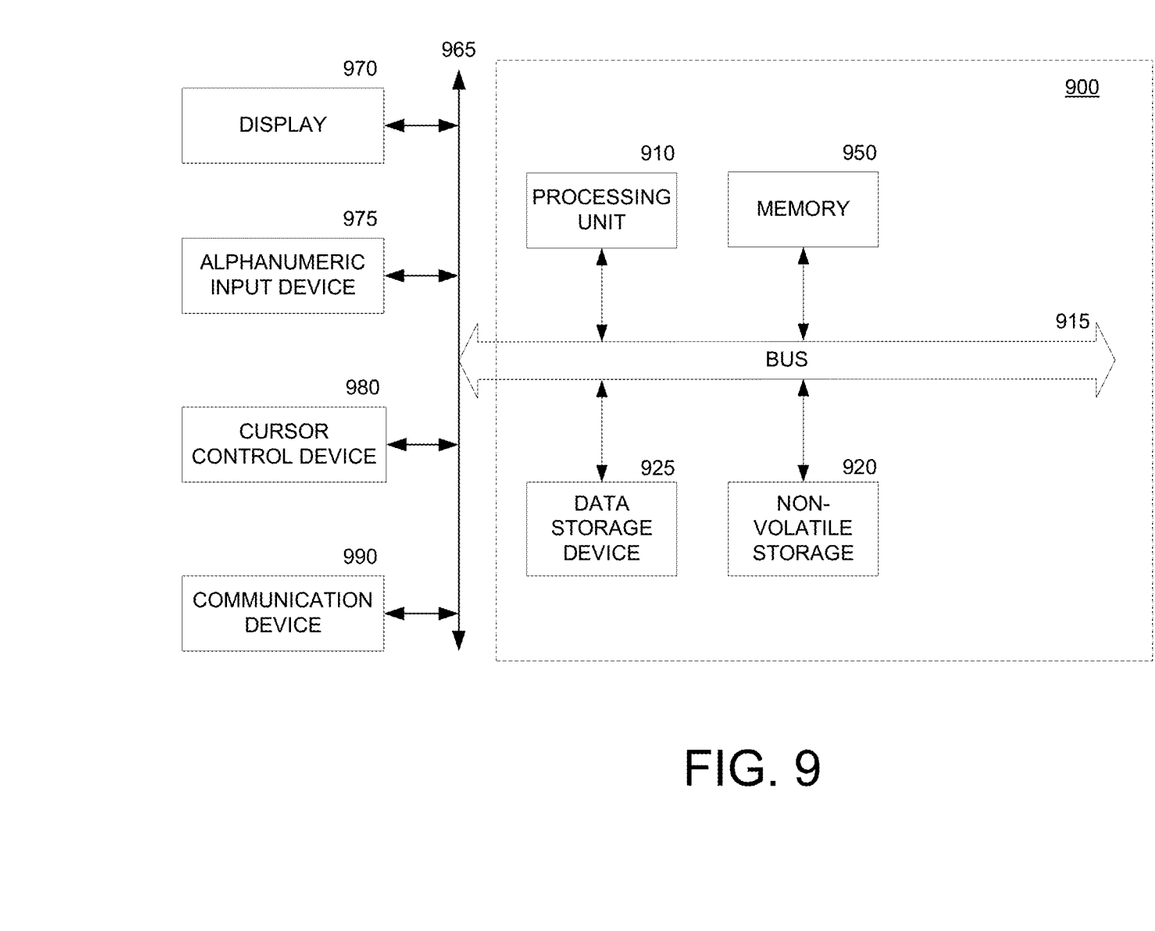
FIG. 9 is an illustration of components of a hardware platform according to an embodiment of the disclosure.

FIG. 9 is an illustration of components of a device to utilize an embodiment of the disclosure. Platform 900 may be used for one of the tileable display panels described above. Platform 900 may also be used to provide image processing, power, display control computing ability (e.g., decoding and converting content) and/or connectivity (e.g., network connectivity) to a device including a tileable display panel. For example, platform 900 may comprise display driver components communicatively coupled to the above described tileable display panel. Platform 900 may be used to decode/convert content into signal formats such as high definition multimedia interface (HDMI), component, composite digital visual interface (DVI), video graphics adapter (VGA), Syndicat des Constructeurs d'Appareils Radiorecepteurs et Televiseursor (SCART), or other image signal formats.

Platform 900 as illustrated includes bus or other internal communication means 915 for communicating information, and processor 910 coupled to bus 915 for processing information. The platform further comprises random access memory (RAM) or other volatile storage device 950 (alternatively referred to herein as main memory), coupled to bus 915 for storing information and instructions to be executed by processor 910. Main memory 950 also may be used for storing temporary variables or other intermediate information during execution of instructions by processor 910. Platform 900 also comprises read only memory (ROM) and/or static storage device 920 coupled to bus 915 for storing static information and instructions for processor 910, and data storage device 925 such as a magnetic disk, optical disk and its corresponding disk drive, or a portable storage device (e.g., a universal serial bus (USB) flash drive, a Secure Digital (SD) card). Data storage device 925 is coupled to bus 915 for storing information and instructions.

Platform 900 may further be coupled to display device 970, such as a cathode ray tube (CRT) or an LCD coupled to bus 915 through bus 965 for displaying information to a computer user. In embodiments where platform 900 provides computing ability and connectivity to a created and installed display device, display device 970 may comprise any of the tileable display panels described above. Alphanumeric input device 975, including alphanumeric and other keys, may also be coupled to bus 915 through bus 965 (e.g., via infrared (IR) or radio frequency (RF) signals) for communicating information and command selections to processor 910. An additional user input device is cursor control device 980, such as a mouse, a trackball, stylus, or cursor direction keys coupled to bus 915 through bus 965 for communicating direction information and command selections to processor 910, and for controlling cursor movement on display device 970. In embodiments utilizing a touch-screen interface, it is understood that display 970, input device 975 and cursor control device 980 may all be integrated into a touch-screen unit.

Another device, which may optionally be coupled to platform 900, is a communication device 990 for accessing other nodes of a distributed system via a network. Communication device 990 may include any of a number of commercially available networking peripheral devices such as those used for coupling to an Ethernet, token ring, Internet, or wide area network. Communication device 990 may further be a null-modem connection, or any other mechanism that provides connectivity between computer system 900 and the outside world. Note that any or all of the components of this system illustrated in FIG. 9 and associated hardware may be used in various embodiments of the disclosure.

It will be appreciated by those of ordinary skill in the art that any configuration of the system illustrated in FIG. 9 may be used for various purposes according to the particular implementation. The control logic or software implementing embodiments of the disclosure can be stored in main memory 950, mass storage device 925, or other storage medium locally or remotely accessible to processor 910.

It will be apparent to those of ordinary skill in the art that any system, method, and process to capture media data as described herein can be implemented as software stored in main memory 950 or read only memory 920 and executed by processor 910. This control logic or software may also be resident on an article of manufacture comprising a computer readable storage medium having computer readable program code embodied therein and being readable the mass storage device 925 and for causing processor 910 to operate in accordance with the methods and teachings herein.

Embodiments of the disclosure may also be embodied in a handheld or portable device containing a subset of the computer hardware components described above. For example, the handheld device may be configured to contain only the bus 915, the processor 910, and memory 950 and/or 925. The handheld device may also be configured to include a set of buttons or input signaling components with which a user may select from a set of available options. The handheld device may also be configured to include an output apparatus such as a LCD or display element matrix for displaying information to a user of the handheld device. Conventional methods may be used to implement such a handheld device. The implementation of the disclosure for such a device would be apparent to one of ordinary skill in the art given the disclosure as provided herein.

Embodiments of the disclosure may also be embodied in a special purpose appliance including a subset of the computer hardware components described above. For example, the appliance may include processor 910, data storage device 925, bus 915, and memory 950, and only rudimentary communications mechanisms, such as a small touch-screen that permits the user to communicate in a basic manner with the device. In general, the more special-purpose the device is, the fewer of the elements need be present for the device to function.

Techniques and architectures for displaying an image are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A tileable display panel, comprising:
   a screen layer upon which a unified image is projected from a backside;
   an illumination layer to generate lamp light;
   a display layer disposed between the screen layer and the lamp layer, the display layer including a pixel array comprising a plurality of pixels, each of the plurality of pixels including an arrangement of four elements comprising:
      a first element, a second element and a third element corresponding, respectively, to a first chrominance dimension, a second chrominance dimension and a third chrominance dimension; and
      a fourth element corresponding to a luminance dimension representing a combination of the first chrominance dimension, the second chrominance dimension and the third chrominance dimension;
   an image processor for executing instructions; and
   a memory coupled to the image processor, wherein the memory stores the instructions, which when executed by the image processor causes the tileable display panel to perform operations including:
      detecting an edge artifact of an image represented at least in part by image data; and
      identifying, in response to detection of the edge artifact, a plurality of pixel data sets of the image data, each of the plurality of pixel data sets including:
         a first parameter, second parameter and third parameter corresponding, respectively, to the first chrominance dimension, the second chrominance dimension and the third chrominance dimension; and
         a fourth parameter corresponding to the luminance dimension; and
      updating the plurality of pixel data sets to reduce the image artifact; and
      performing an update of the fourth parameter of each of the plurality of pixel data sets independent of any update to the third parameter of each of the plurality of pixel data sets.

2. The tileable display panel of claim 1, wherein the four elements are located with respect to one another to form a sequence of elements which extends along a curved line or an angled line, and wherein the fourth element is located at a first end of the sequence of elements.

3. The tileable display panel of claim 2, wherein the third element is located at a second end of the sequence of elements, and wherein the third chrominance dimension corresponds to a blue color.

4. The tileable display panel of claim 1, wherein, of the four elements, the first element and the fourth element are located in different respective element rows of the pixel array and in different respective element columns of the pixel array, and wherein the first chrominance dimension corresponds to a green color.

5. The tileable display panel of claim 1, wherein any update of the plurality of pixel data sets to reduce the image artifact is performed independent of any update to one or more of the first parameter, the second parameter and the third parameter of the plurality of pixel data sets.

6. The tileable display panel of claim 1, wherein the plurality of pixel data sets includes a first pixel data set and a second pixel data set, and wherein performing the update of the fourth parameter of each of the plurality of pixel data sets includes:
   swapping with one another the fourth parameter of the first pixel data set and the fourth parameter of the second pixel data set.

7. The tileable display panel of claim 1, wherein the plurality of pixel data sets includes a first pixel data set and a second pixel data set, and wherein performing the update of the fourth parameter of each of the plurality of pixel data sets further includes:
   assigning a previously assigned fourth parameter of the first pixel data set to the first parameter of the first pixel data set; and
   assigning a previously assigned first parameter of the first pixel data set to the fourth parameter of the second pixel data set.

8. The tileable display panel of claim 1, wherein performing the update of the fourth parameter of each of the plurality of pixel data sets comprises:
   calculating an average, a mean or a median of the fourth parameter of each of the plurality of pixel data sets to represent a calculated value; and
   setting the fourth parameter of at least one of the plurality of pixel data sets equal to the calculated value.

9. The tileable display panel of claim 1, wherein each of the plurality of pixels is associated with a pixel data set to emit light representing a single image pixel, and wherein the arrangement of the four elements of each of the plurality of pixels is a single common arrangement that either spans both two element rows of the pixel array and three element columns of the pixel array, or spans both three element rows of the pixel array and two element columns of the pixel array.

10. A method comprising:
   detecting an edge artifact of an image represented at least in part by image data;
   in response to detection of the edge artifact, identifying a plurality of pixel data sets each including:
      a first parameter, second parameter and third parameter corresponding, respectively, to a first chrominance dimension, a second chrominance dimension and a third chrominance dimension; and
      a fourth parameter corresponding to a luminance dimension representing a combination of the first chrominance dimension, the second chrominance dimension and the third chrominance dimension; and
   updating the plurality of pixel data sets to reduce the image artifact, including performing an update of the fourth parameters of the plurality of pixel data sets independent of any evaluation to update the third parameters of the plurality of pixel data set.

11. The method of claim 10, wherein any update of the plurality of pixel data sets to reduce the image artifact is performed independent of any update to the third parameters of the plurality of pixel data sets.

12. The method of claim 10, wherein any update of the fourth parameters of the plurality of pixel data sets to reduce the image artifact is performed independent of any evaluation to determine an update to the third parameters of the plurality of pixel data sets.

13. The method of claim 10, wherein performing the update of the fourth parameters includes:
   calculating a value representing an average, a mean or a median of the fourth parameters of the plurality of pixel data sets; and
   setting one or more of the fourth parameters of the plurality of pixel data sets equal to the value.

14. A non-transitory computer-readable storage medium having stored thereon instructions which, when executed by one or more processing units, cause the one or more processing units to perform a method comprising:
   detecting an edge artifact of an image represented at least in part by image data;
   in response to detection of the edge artifact, identifying a plurality of pixel data sets each including:
      a first parameter, second parameter and third parameter corresponding, respectively, to a first chrominance dimension, a second chrominance dimension and a third chrominance dimension; and
      a fourth parameter corresponding to a luminance dimension representing a combination of the first chrominance dimension, the second chrominance dimension and the third chrominance dimension; and
   updating the plurality of pixel data sets to reduce the image artifact, including performing an update of the fourth parameters of the plurality of pixel data sets independent of any evaluation to update the third parameters of the plurality of pixel data set.

15. The computer-readable storage medium of claim 14, wherein any update of the plurality of pixel data sets to reduce the image artifact is performed independent of any update to the third parameters of the plurality of pixel data sets.

16. The computer-readable storage medium of claim 14, wherein any update of the fourth parameters of the plurality of pixel data sets to reduce the image artifact is performed independent of any evaluation to determine an update to the third parameters of the plurality of pixel data sets.

17. The computer-readable storage medium of claim 14, wherein performing the update of the fourth parameters includes:
   calculating a value representing an average, a mean or a median of the fourth parameters of the plurality of pixel data sets; and
   setting one or more of the fourth parameters of the plurality of pixel data sets equal to the value.

* * * * *